United States Patent
Lee et al.

(10) Patent No.: US 7,667,359 B2
(45) Date of Patent: Feb. 23, 2010

(54) STATOR STRUCTURE AND MANUFACTURING METHOD THEREOF

(75) Inventors: Chien-Ming Lee, Taoyuan Hsien (TW); Deng-Chu Fu, Taoyuan Hsien (TW); Ying-Chi Chen, Taoyuan Hsien (TW); Wen-Shi Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 90 days.

(21) Appl. No.: 11/407,191

(22) Filed: Apr. 20, 2006

(65) Prior Publication Data

US 2007/0126296 A1    Jun. 7, 2007

(30) Foreign Application Priority Data

Dec. 2, 2005  (TW) .............................. 94142387 A

(51) Int. Cl.
*H02K 5/10*  (2006.01)
*H02K 5/12*  (2006.01)

(52) U.S. Cl. .............................. 310/86; 310/43; 310/88; 310/67 R; 310/89

(58) Field of Classification Search .................. 310/86, 310/43, 88, 67 R, 71, 89; 361/616, 695; 174/50, 66, 74 R, 135, 151, 659–669
See application file for complete search history.

(56) References Cited

U.S. PATENT DOCUMENTS

| | | | |
|---|---|---|---|
| 3,075,250 A * | 1/1963 | Strohm et al. ............. | 264/272.2 |
| 3,256,590 A * | 6/1966 | Myers ........................... | 29/96 |
| 6,133,655 A * | 10/2000 | Suzuki et al. ................. | 310/51 |
| 6,359,354 B1 * | 3/2002 | Watanabe et al. ............. | 310/87 |
| 6,362,554 B1 * | 3/2002 | Neal .................... | 310/216.003 |
| 6,394,767 B1 * | 5/2002 | Matsumoto ............. | 417/423.1 |
| 6,798,091 B2 * | 9/2004 | Kudou et al. .................. | 310/43 |
| 2003/0164653 A1 * | 9/2003 | Yasuda ......................... | 310/90 |
| 2004/0222712 A1 * | 11/2004 | Hong et al. ............... | 310/67 R |
| 2004/0256933 A1 * | 12/2004 | Toyokawa et al. ............. | 310/89 |
| 2005/0012416 A1 * | 1/2005 | Huang et al. .................. | 310/88 |
| 2007/0085426 A1 * | 4/2007 | Lee et al. ...................... | 310/43 |
| 2007/0145842 A1 * | 6/2007 | Zhu et al. ..................... | 310/88 |

FOREIGN PATENT DOCUMENTS

JP  10191611  7/1998

OTHER PUBLICATIONS

3M TC-2700 (http://multimedia.3m.com/mws/mediawebserver?66666UuZjcFSLXTtlxTV5X&yEVuQEcuZgVs6EVs6E666666-).*
3M DP-190 (http://multimedia.mmm.com/mws/mediawebserver.dyn?66666660Zjcf6IVs6EVs666yz0COrrrrQ-).*
3M_DP190.pdf*
3M_TC2707.pdf.*

* cited by examiner

*Primary Examiner*—Quyen Leung
*Assistant Examiner*—John K Kim
(74) *Attorney, Agent, or Firm*—Birch, Stewart, Kolasch & Birch, LLP

(57) ABSTRACT

A stator structure includes a first cover, a stator assembly and a filler. The first cover has an accommodation space for accommodating the stator assembly therein. The filler is applied between the first cover and the stator assembly to surround the stator assembly. A manufacturing method of the stator structure is also disclosed.

8 Claims, 14 Drawing Sheets

STATOR STRUCTURE AND MANUFACTURING METHOD THEREOF

BACKGROUND OF THE INVENTION

1. Field of Invention

The present invention relates to a stator structure and a manufacturing method thereof, and more particularly to a stator structure with water-proof effect and a manufacturing method thereof.

2. Related Art

Accompanying with the development of electronic industry, motor has been widely applied to lots of fields and has become one of the well-developed technologies in the industry. Vehicles, fans, water pumps, and even computer peripheral devices, for example printers or scanners, are all using motor to operate. However, the stator structure, including a coil and a circuit board, of the motor is sensitive to moisture which will cause the interior of the motor to be moist and lower the lifetime of the motor.

Take the fan as an example, the traditional common method to protect the moisture entering the internal elements of the motor is to shorten the gaps between the rotor structure and the stator structure and between the fan frame and the stator structure. However, this kind of protection is still limited and is not enough.

It is thus imperative to provide a stator structure with water-proof effect and a manufacturing method thereof.

SUMMARY OF THE INVENTION

In view of the foregoing, the present invention provides a stator structure and a manufacturing method thereof capable of being applied to wet or high-salted environment.

To achieve the above, a stator structure according to the present invention includes a first cover, a stator assembly and a filler. The first cover has an accommodation space and the stator assembly is disposed in the accommodation space. The filler is applied between the first cover and the stator assembly to surround the stator assembly.

To achieve the above, a manufacturing method of a stator structure according to the present invention includes the steps of providing at least one first cover having an accommodation space; disposing a stator assembly in the accommodation space of the first cover, and applying a filler between the first cover and the stator assembly. The stator assembly is surrounded by the first cover and the filler such that the stator assembly is isolated from the environment. Accordingly, the product including the stator structure is capable of being applied to wet or high-salted environment, to achieve the effect of water-proofing and enhance its performance.

The manufacturing method can further include a step of providing a second cover combined with the first cover. The stator assembly is located between the first cover and the second cover. Then, the filler is applied among the first cover, the stator assembly and the second cover.

To achieve the above, another manufacturing method of a stator structure according to the present invention includes the steps of disposing a stator assembly on a base of a fan frame; providing at least one first cover having an accommodation space; connecting the first cover with the fan frame to make the stator assembly located between the first cover and the base; and applying a filler between the first cover and the base of the fan frame. The stator assembly is effectively isolated from the environment by the method. A product including such stator structure is capable of being applied to wet or high-salted environment, to achieve the effect of water-proofing.

BRIEF DESCRIPTION OF THE DRAWINGS

The present invention will become more fully understood from the detailed description given herein below illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
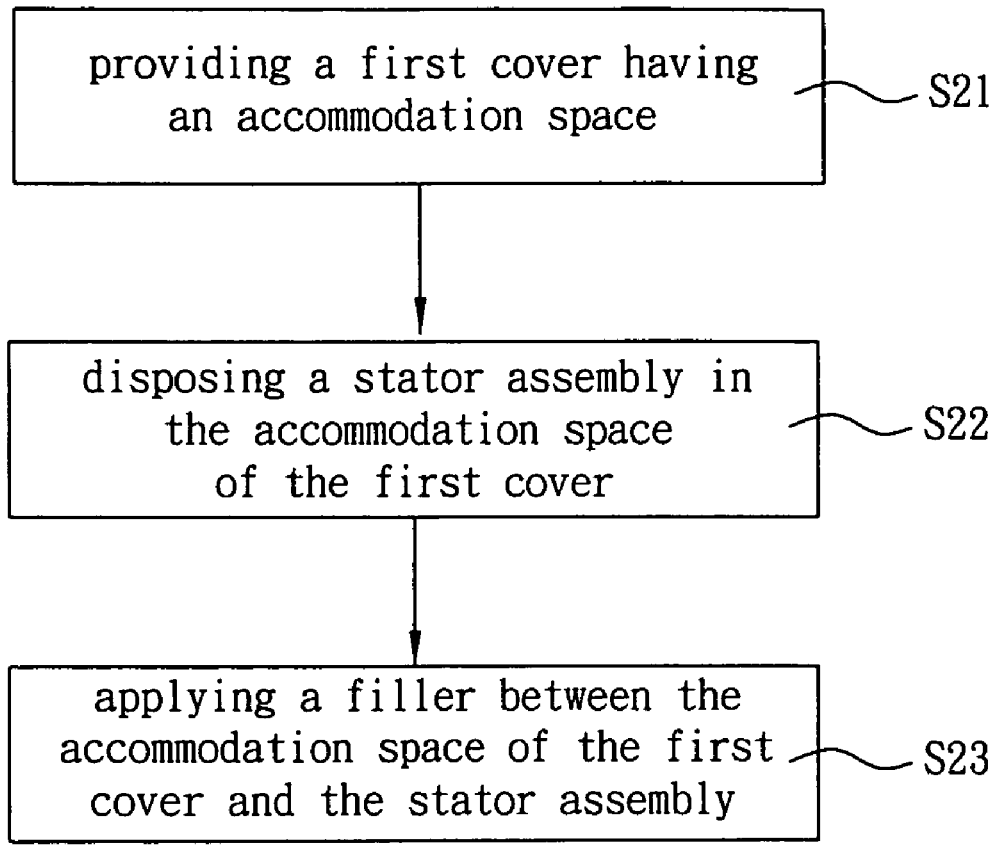
FIG. 1 is a flow chart showing a manufacturing method of a stator structure according to a first embodiment of the present invention.
Figure 2A:
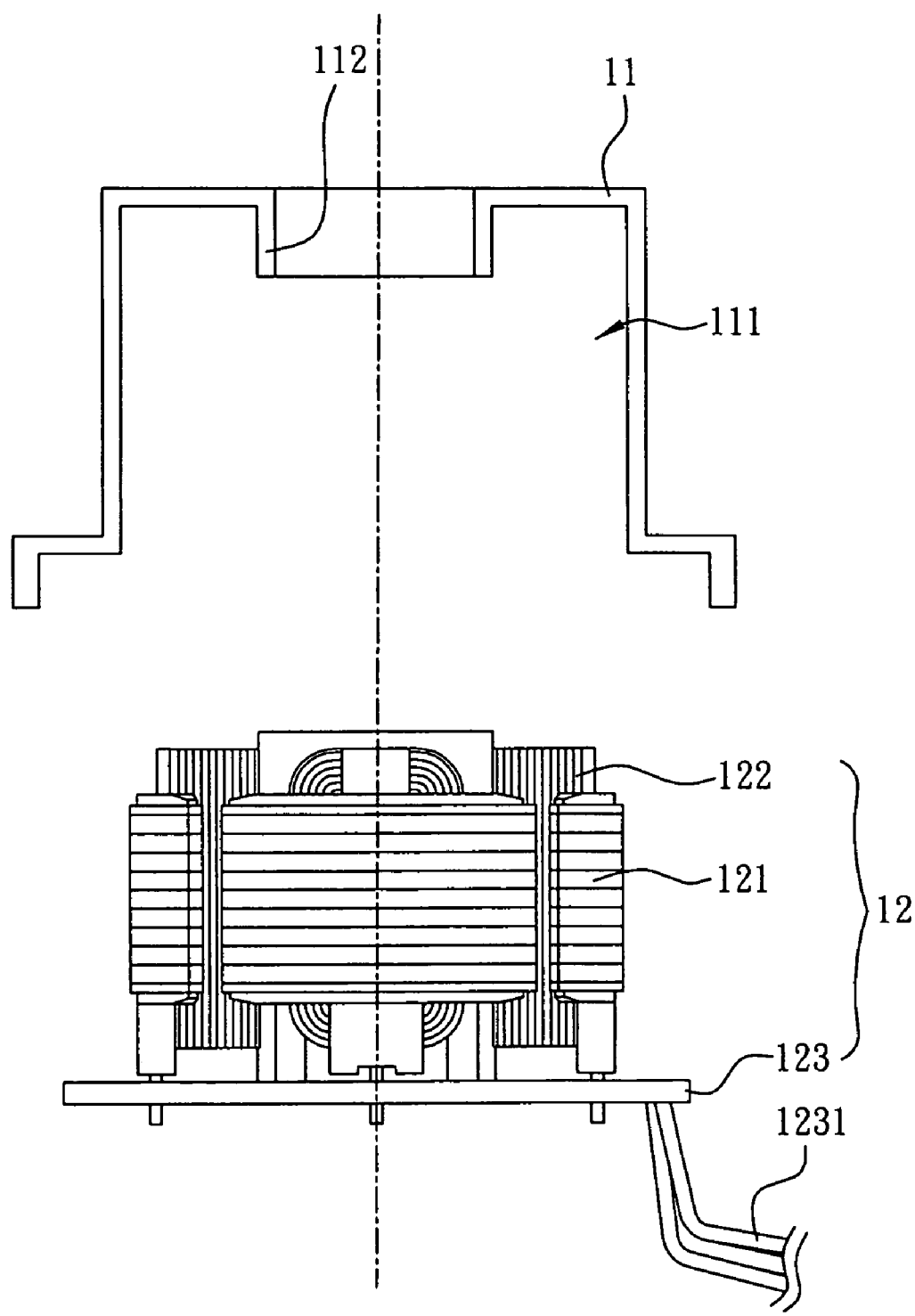
FIGS. 2A to 2D are schematic views showing the manufacturing method of the stator structure according to the first embodiment of the present invention.
Figure 2B:
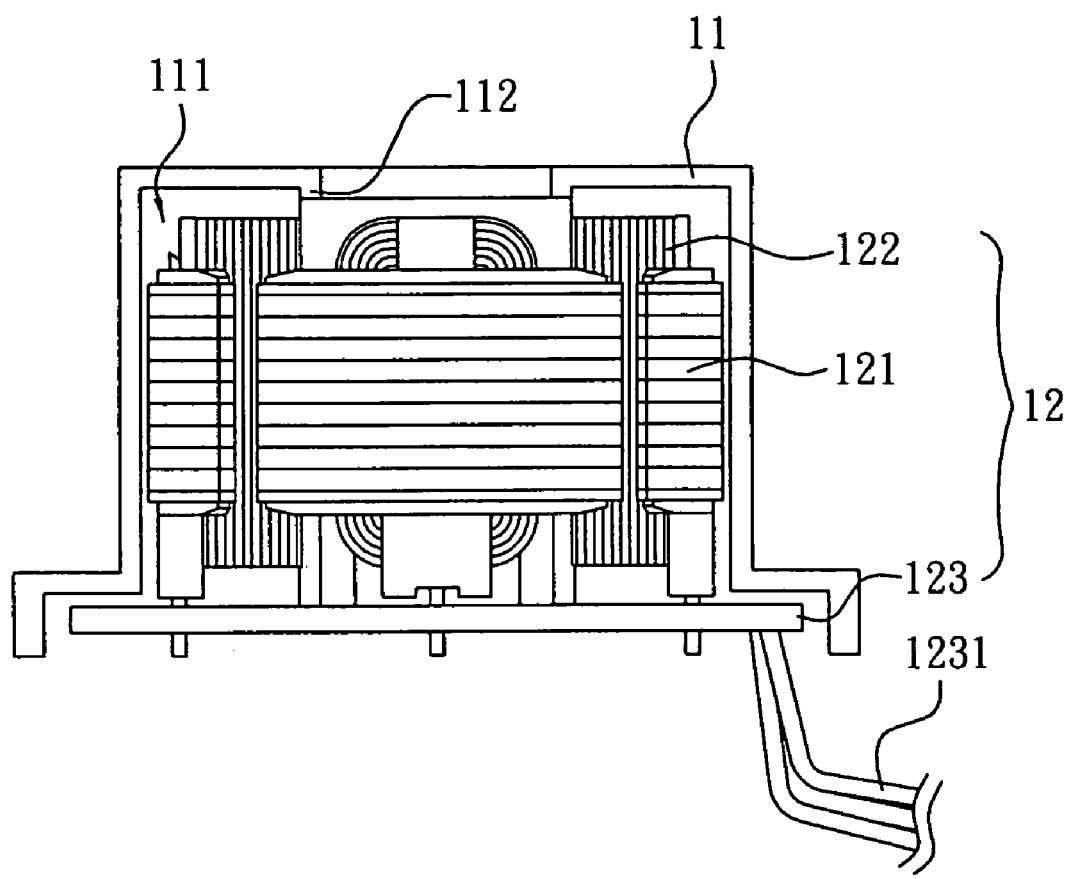
Figure 2C:
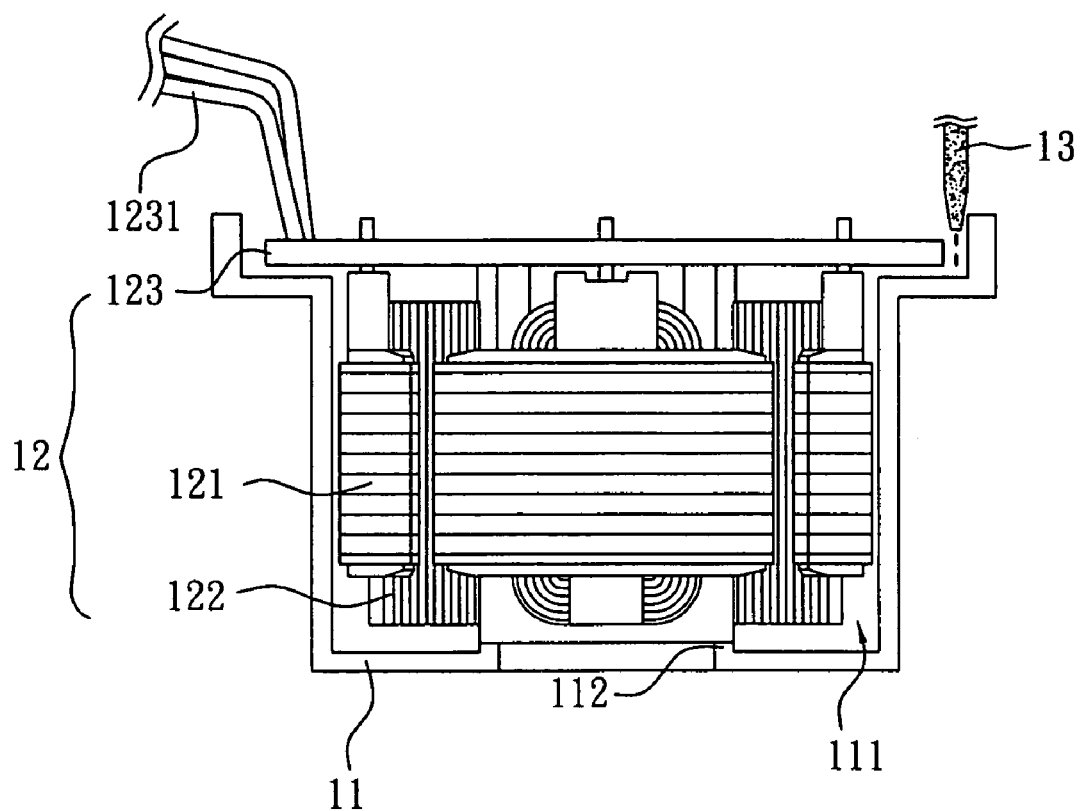
Figure 2D:
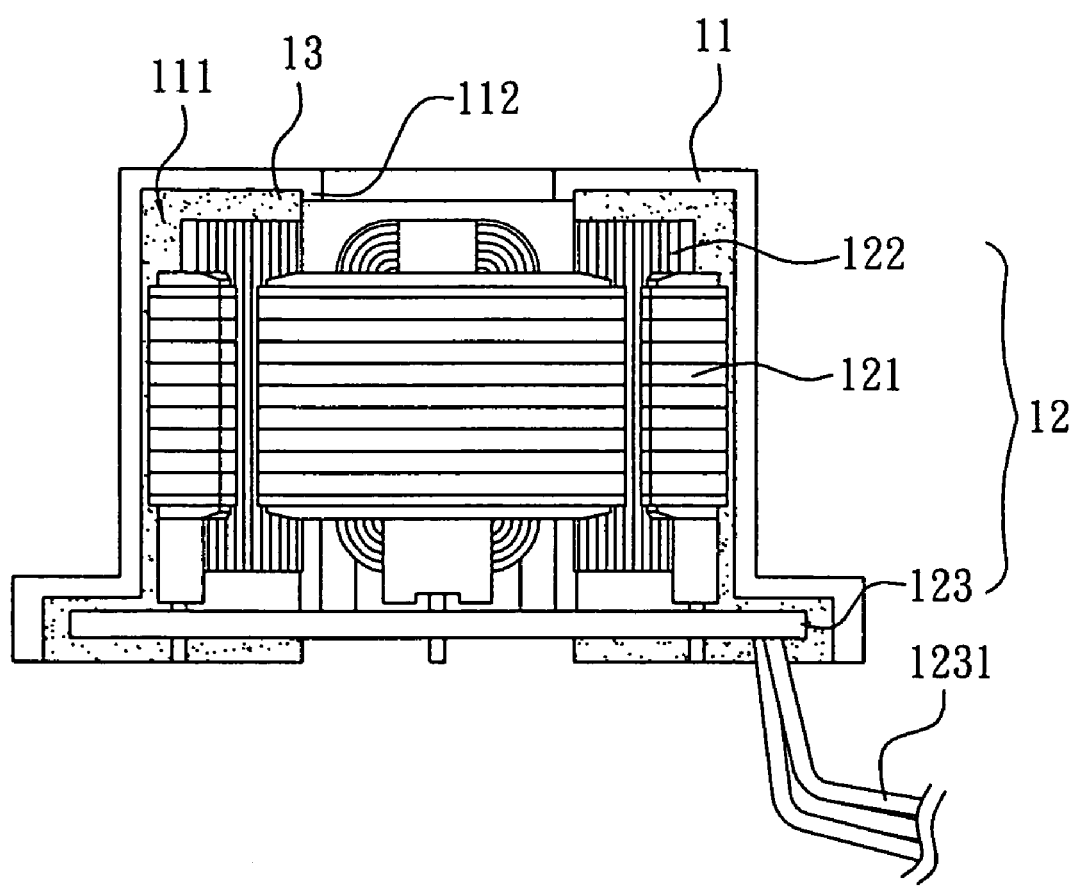

FIGS. 1 to 2D show a manufacturing method of a stator structure according to a first embodiment of the present invention. The manufacturing method of this embodiment includes the steps S21 to S23. As shown in FIGS. 1 and 2A, step S21 is to provide a first cover 11 having an accommodation space 111. The first cover 11 of this embodiment has a restricting portion 112. The material of the first cover 11 includes but not limited to plastics, acryl or metal.

As shown in FIGS. 1 and 2B, step S22 is to dispose a stator assembly 12 in the accommodation space 111 of the first cover 11. In this embodiment, the stator assembly 12 is in contact with the restricting portion 112. The stator assembly 12 includes a plurality of stacked silicon steel sheets 121, a coil 122 winding on the silicon steel sheets 121, and a circuit board 123 located at one side of the silicon steel sheets 121 and electrically connected with the silicon steel sheets 121. A wire 1231 is electrically connected with the circuit board 123.

As shown in FIGS. 1 and 2C, step S23 is to apply a filler 13 between the accommodation space 111 of the first cover 11 and the stator assembly 12. The filler 13 of this embodiment is a liquid or fluid material made of, including but not limited to, epoxy resin, silica gel or polyurethane.

As shown in FIG. 2C, the filler 13 is applied into a gap between the circuit board 123 and the first cover 11, and then is filled between the accommodation space 111 of the first cover 11 and the stator assembly 12. An external tooling (not shown) is cooperated such that the filler 13 can cover the bottom of the circuit board 123. After, the filler 13 is to be solidified by quick cooling at room temperature or baking at high temperature. Finally, the stator structure with waterproof effect is formed as shown in FIG. 2D.

Figure 3:
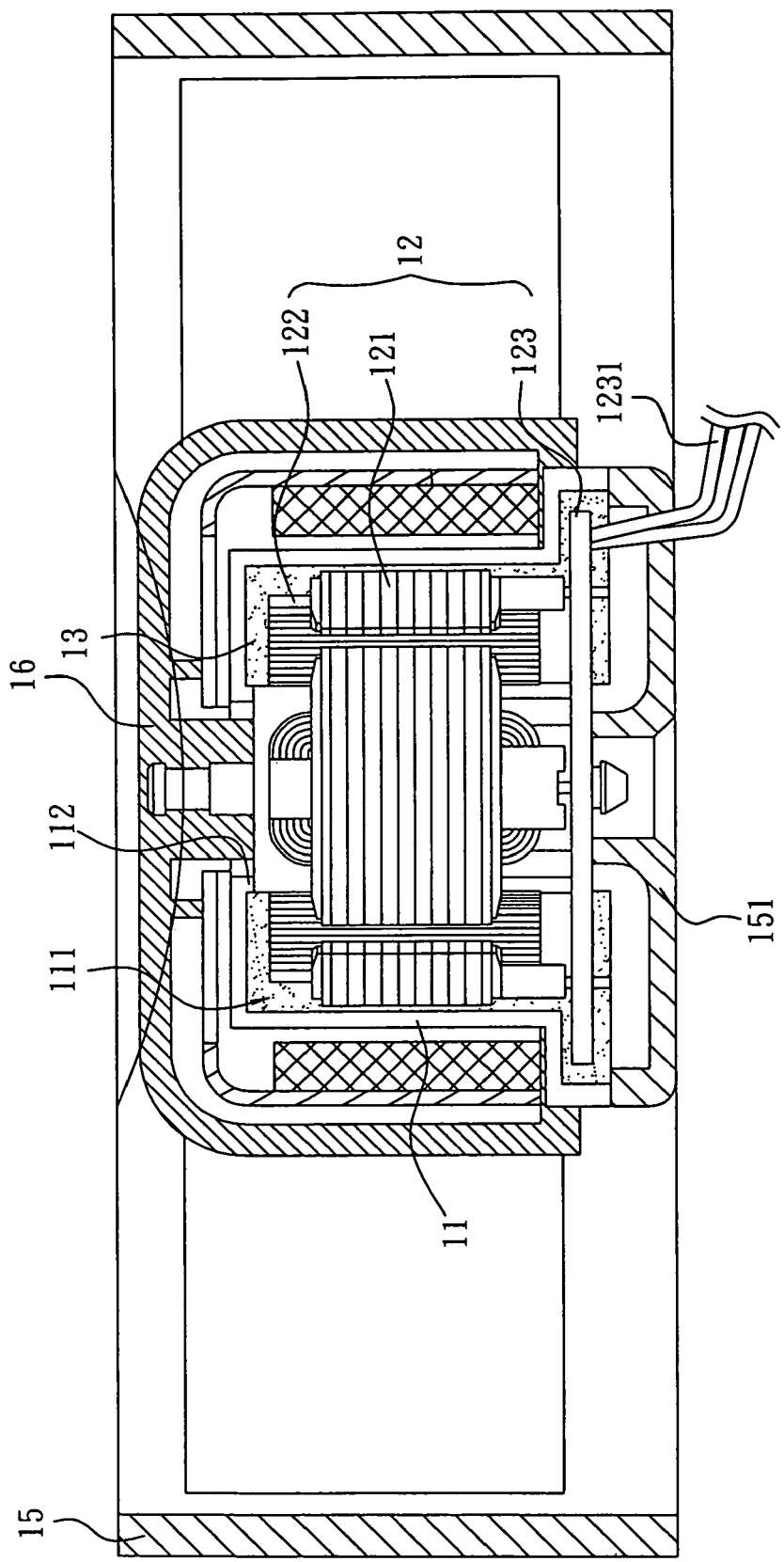
FIG. 3 is a schematic view showing the stator structure of FIG. 2D disposed in a fan frame.

As shown in FIG. 3, the stator assembly 12 and the first cover 11 can be further disposed in a fan frame 15. In this embodiment, the stator assembly 12 and the first cover 11 are disposed on a base 151 of the fan frame 15. In addition, the stator assembly 12 and a rotor 16 are sequentially disposed in the fan frame 15 to form a fan.

As mentioned above, the stator assembly 12 is covered by the first cover 11 and the filler 13 such that the stator assembly 12 is isolated from the environment. A product, for example a fan, including such stator structure is capable of being applied to wet or high-salted environment, to enhance the performance thereof with the water-proof effect.

Figure 4:
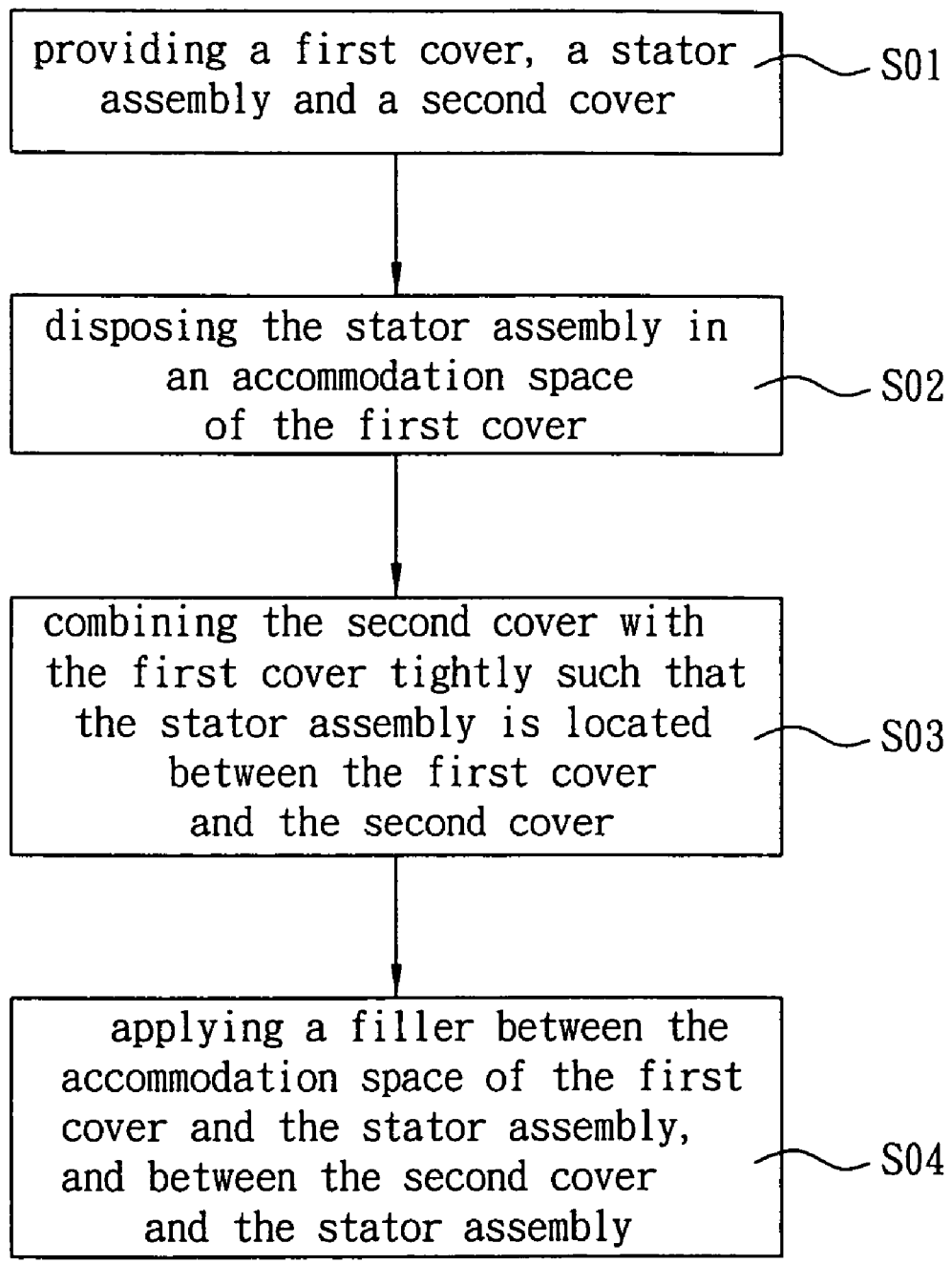
FIG. 4 is a flow chart showing a manufacturing method of a stator structure according to a second embodiment of the present invention.
Figure 5A:
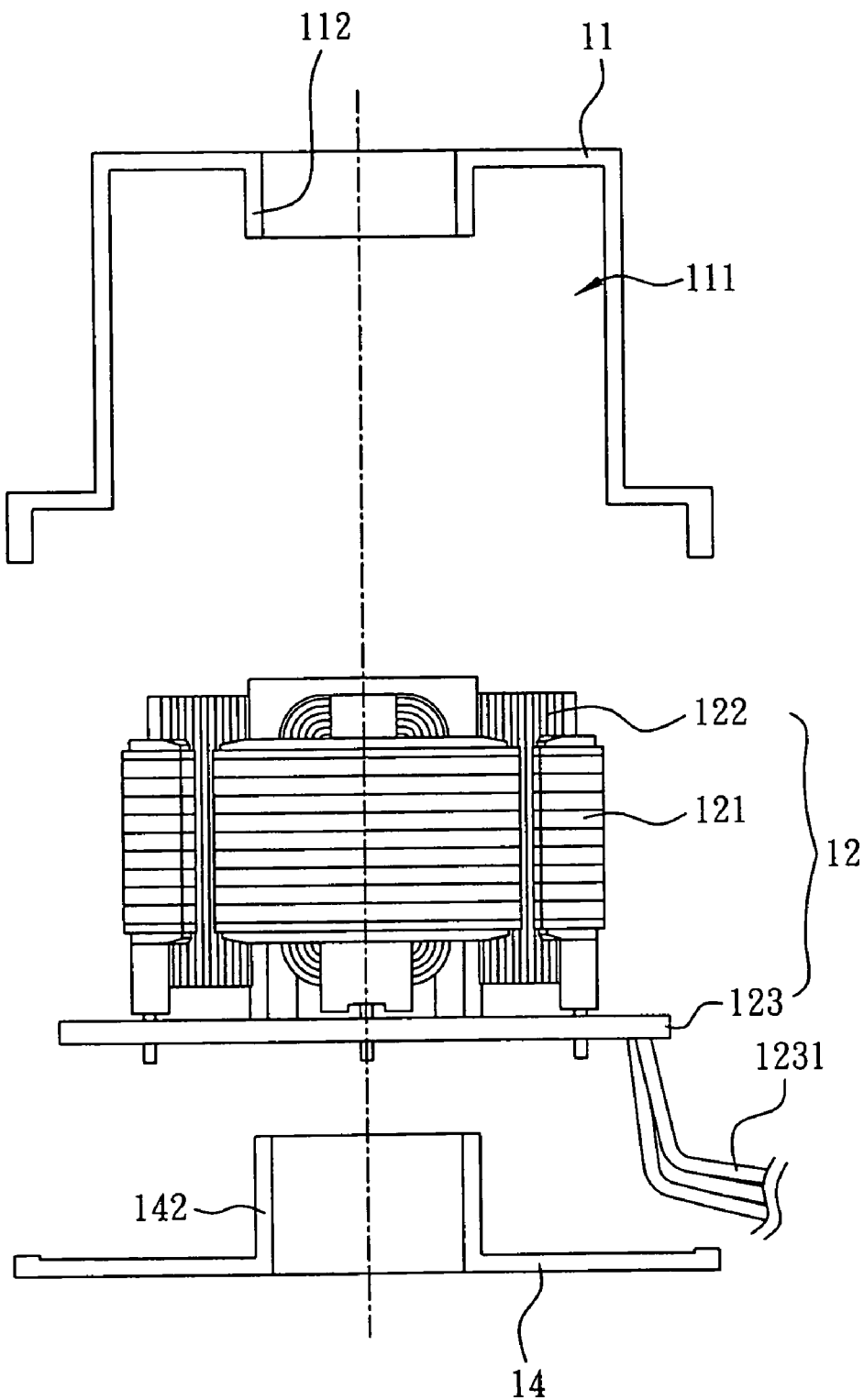
FIGS. 5A to 5C are schematic views showing the manufacturing method of the stator structure according to the second embodiment of the present invention.
Figure 5B:
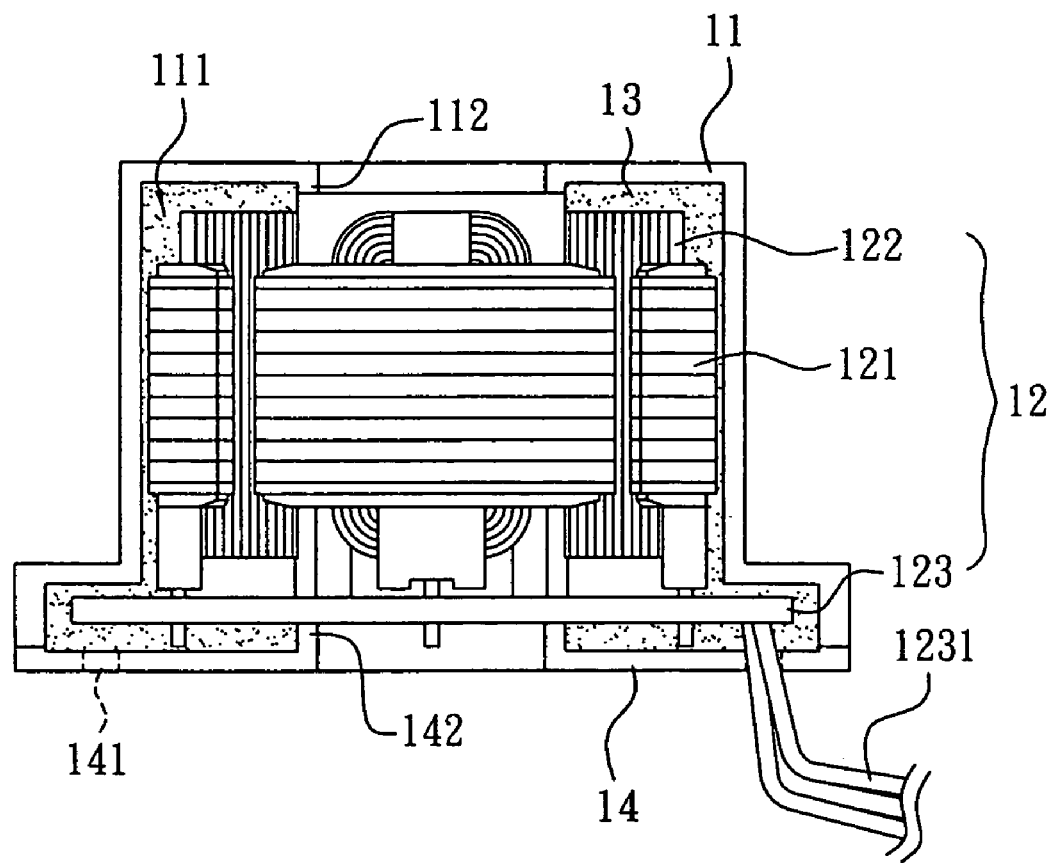
Figure 5C:
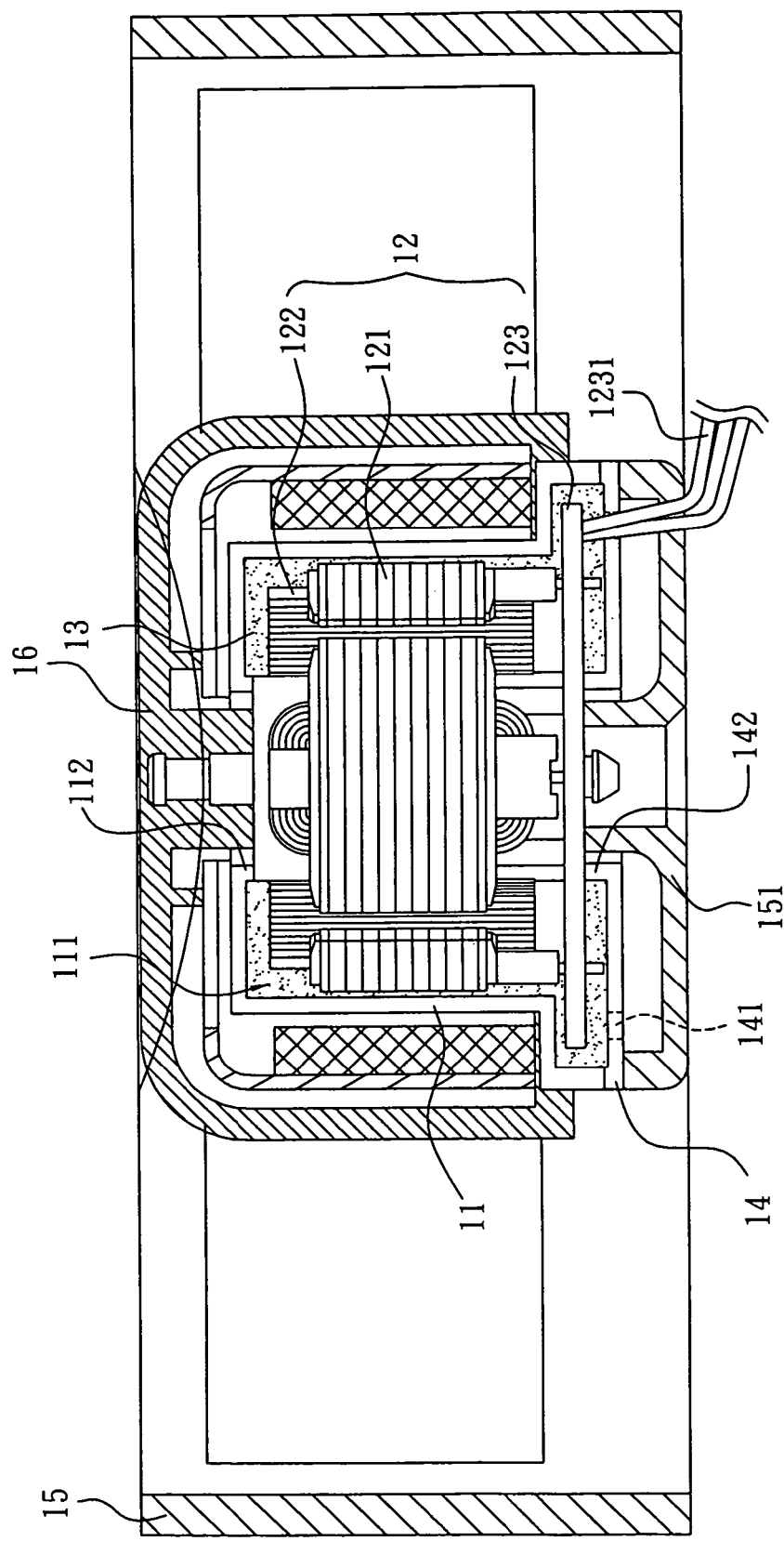

FIGS. 4 to 5C show a manufacturing method of a stator structure according to a second embodiment of the present invention. The manufacturing method of this embodiment includes the steps S01 to S04. As shown in FIGS. 4 and 5A, step S01 is to provide a first cover 11, a stator assembly 12 and a second cover 14. The first cover 11 has an accommodation space 111 and a restricting portion 112. The second cover 14 also has a restricting portion 142. The first cover 11 and the second cover 14 are made of plastics, acryl or metal.

As shown in FIGS. 4 and 5B, step S02 is to dispose the stator assembly 12 between the accommodation space 111 of the first cover 11 and the second cover 14. In this embodiment, the stator assembly 12 is in contact with the restricting portion 112 and the restricting portion 142 so as to be restricted. The stator assembly 12 includes a plurality of stacked silicon steel sheets 121, a coil 122 and a circuit board 123. The silicon steel sheets 121, the coil 122 and the circuit board 123 have the same constructions and functions as those in the previous embodiment, and the detailed descriptions thereof will be omitted.

As shown in FIG. 5B, step S03 is to combine the second cover 14 with the first cover 11 tightly. In this embodiment, the first cover 11 and the second cover 14 are connected by engaging, lodging, locking or adhering.

Then, step S04 is to apply a filler 13 among the first cover 11, the stator assembly 12 and the second cover 14 to form the stator structure. In this embodiment, the filler 13 is a liquid or fluid water-proof material made of, including but not limited to, epoxy resin, silica gel or polyurethane. Specifically, the filler 13 is applied through a hole 141 of the second cover 14. After the filler-applying step is completed, the filler 13 is solidified by quick cooling at low temperature or baking at high temperature. Of course, the hole can also be formed on the first cover 11 (not shown).

As shown in FIG. 5C, the stator assembly 12, the first cover 11 and the second cover 14 can be further disposed in a fan frame 15. In this embodiment, the stator assembly 12, the first cover 11 and the second cover 14 are disposed on a base 151 of the fan frame 15. In addition, the stator assembly 12 and a rotor 16 are sequentially disposed in the fan frame 15 to form a fan.

As mentioned above, the stator assembly 12 is completely covered by the first cover 11 and the second cover 14. Then, the filler 13 is applied into the gaps between the first cover 11 and the stator assembly 12, and between the second cover 14 and the stator assembly 12 such that the stator assembly 12 is isolated from the environment. A product including such stator structure is capable of being applied to wet or high-salted environment to achieve the effect of water-proofing and enhance the performance. The finished stator structure can be easily assembled with other work pieces, for example a fan frame, and needs not to remove the first and the second covers. The process is thus shortened and facilitates the production.

Figure 6:
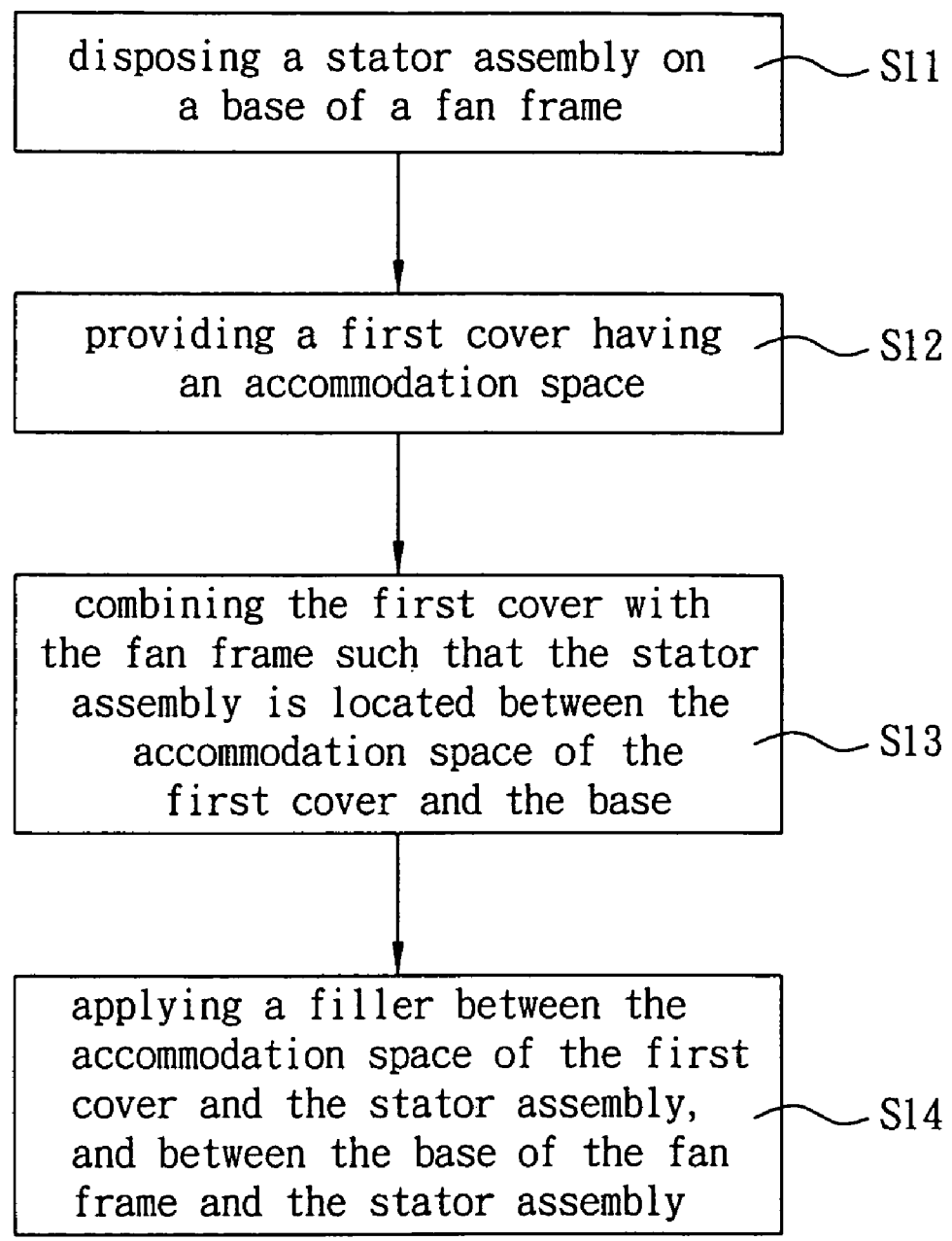
FIG. 6 is a flow chart showing a manufacturing method of a stator structure according to a third embodiment of the present invention.
Figure 7A:
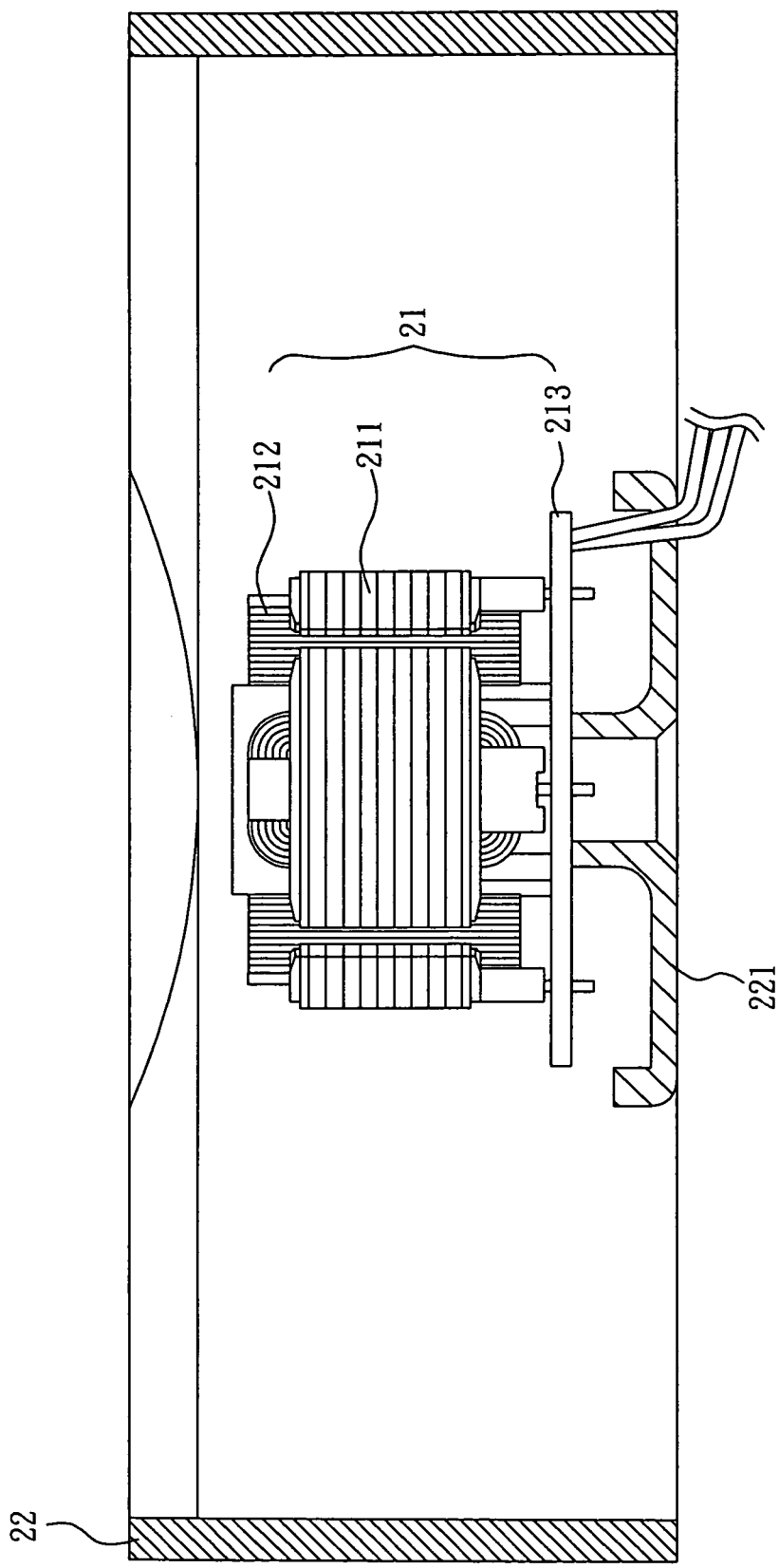
FIGS. 7A to 7C are schematic views showing the manufacturing method of the stator structure according to the third embodiment of the present invention.
Figure 7B:
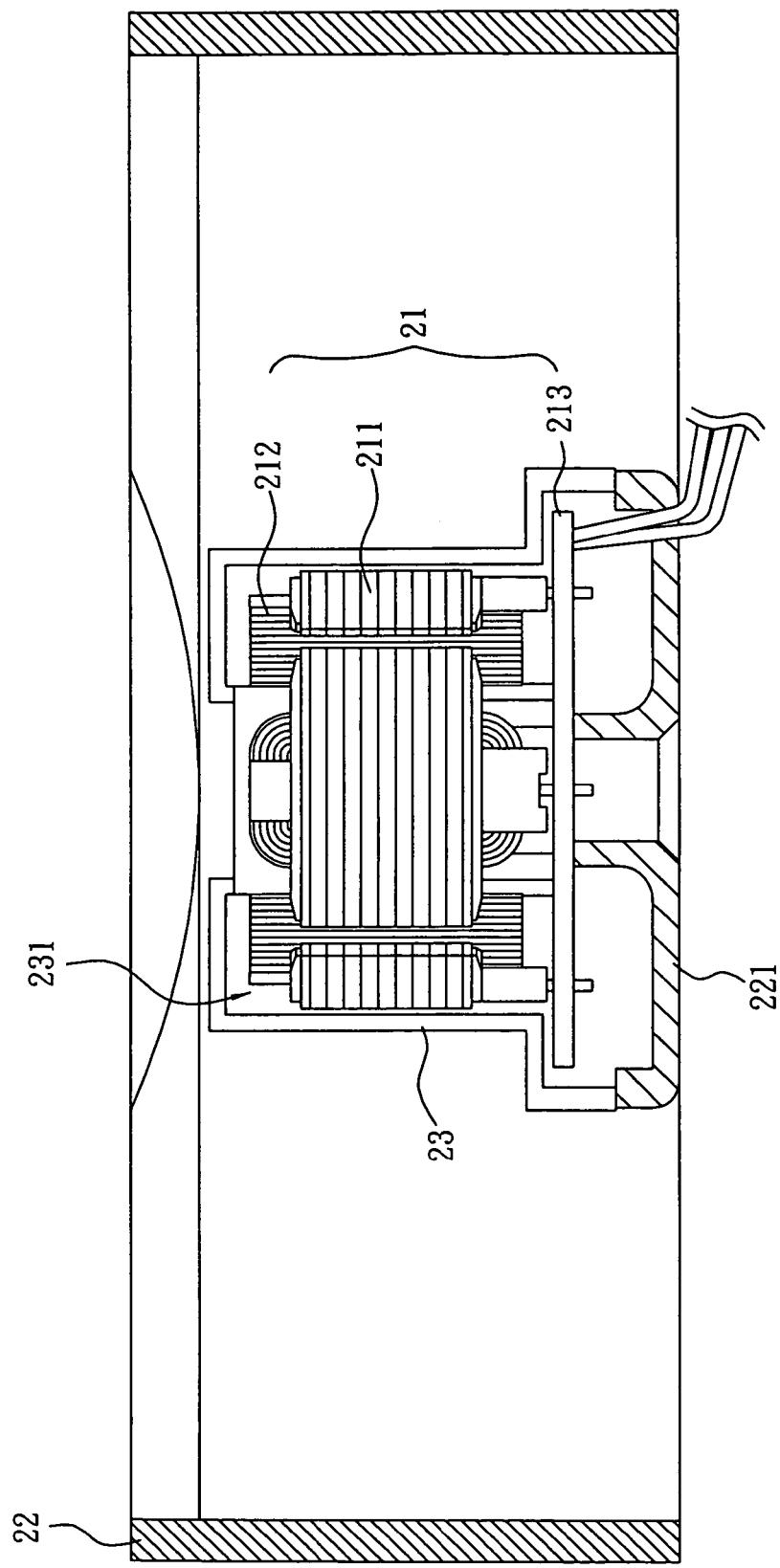
Figure 7C:
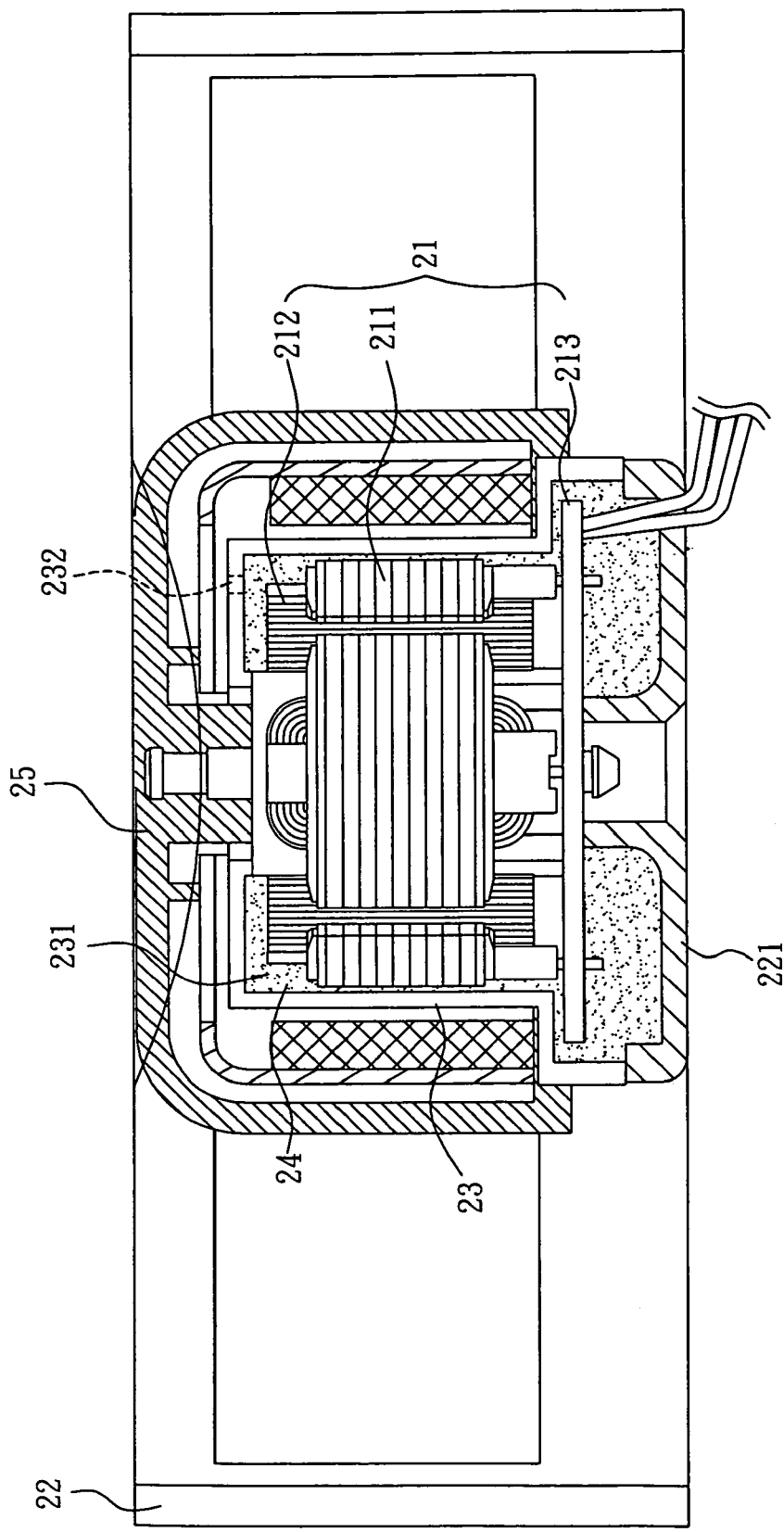

FIGS. 6 to 7C show a manufacturing method of a stator structure according to a third embodiment of the present invention. The manufacturing method of this embodiment includes the steps S11 to S14. As shown in FIGS. 6 and 7A, step S11 is to dispose a stator assembly 21 on a base 221 of a fan frame 22. The stator assembly 21, which is the same as that described in the previous embodiment, includes a plurality of stacked silicon steel sheets 211, a coil 212 and a circuit board 213.

As shown in FIGS. 6 and 7B, step S12 is to provide a first cover 23 having an accommodation space 231 for receiving the stator assembly 21. Step S13 is to connect the first cover 23 with the fan frame 22 to make the stator assembly 21 located between the first cover 23 and the base 221. The first cover 23 of this embodiment is made of, including but not limited to, plastics, acryl or metal. In addition, the first cover 23 and the fan frame 22 are connected, including but not limited, by engaging, lodging, locking or adhering.

As shown in FIGS. 6 and 7C, step S14 is to apply a filler 24 between the first cover 23 and the stator assembly 21, and between the base 221 of the fan frame 22 and the stator assembly 21. The filler 24, which is the same as that described in the previous embodiment, is a liquid or fluid water-proof material made of epoxy resin, silica gel or polyurethane.

Specifically, the filler 24 is filled through a hole 232 of the first cover 23 or a wire hole (not shown) of the stator structure to cover the stator assembly 21. After the filler-applying step is completed, the filler 24 is solidified by quick cooling at low temperature or baking at high temperature.

As shown in FIG. 7C, the stator assembly 21 and a rotor 25 are sequentially disposed in the fan frame 22 to form a fan.

In summary, the stator assembly 21 is completely covered by the first cover 23 and the fan frame 22. Then, the filler 24 is applied into the gaps between the first cover 23 and the stator assembly 21, and between the fan frame 22 and the stator assembly 21 such that the stator assembly 21 is isolated from the environment. A product including such stator structure is capable of being applied to wet or high-salted environment, to achieve the effect of water-proofing and enhance the performance. In addition, the first cover 23 needs not to be removed after the filler applying and the solidifying steps. Besides, the stator assembly 21 is fixed to the fan frame at first so this method does not have extra process to assemble the stator structure to the fan frame 22 later, whereby the manufacturing method shortens and facilitates the production process.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A manufacturing method of a stator structure adapted to be assembled with a rotor, comprising steps of:

providing a first cover and a second cover to define an accommodation space between the first and second covers;

disposing a stator assembly in the accommodation space;

applying a filler between the first cover and the second cover after the first and second covers are assembled together to cover the stator assembly;

disposing the first cover, the second cover and the stator assembly on a base; and coupling the rotor with the first cover, the second cover and the stator assembly, wherein the rotor is disposed outside the first cover.

2. The manufacturing method according to claim 1, wherein the stator assembly having a circuit board.

3. The manufacturing method according to claim 1, wherein the first cover and the second cover are combined by engaging, lodging, locking or adhering.

4. The manufacturing method according to claim 1, wherein the first cover or the second cover has a hole for applying the filler into a space between the first cover and the second cover.

5. The manufacturing method according to claim 1, further comprising a step of:

connecting the first cover with a base of a fan frame to make the stator assembly located on the base.

6. The manufacturing method according to claim 1, wherein the first cover or the second cover is made of plastics, acryl or metal.

7. The manufacturing method according to claim 1, wherein the filler is made of epoxy resin, silica gel or polyurethane.

8. The manufacturing method according to claim 7, wherein the filler is solidified by quick cooling or baking at high temperature after the filler is applied.

* * * * *